United States Patent [19]

Sato et al.

[11] Patent Number: 4,818,787

[45] Date of Patent: Apr. 4, 1989

[54] PROCESS FOR PRODUCING POLYVINYL ESTER HAVING A HIGH DEGREE OF POLYMERIZATION AND PROCESS FOR PRODUCING POLYVINYL ALCOHOL HAVING A HIGH DEGREE OF POLYMERIZATION

[75] Inventors: Toshiaki Sato; Junnosuke Yamauchi, both of Kurashiki; Takuji Okaya, Nagaokakyo, all of Japan

[73] Assignee: Kuraray Co., Ltd., Kurashiki, Japan

[21] Appl. No.: 874,663

[22] Filed: Jun. 16, 1986

[51] Int. Cl.$^4$ .............................................. C08F 8/00
[52] U.S. Cl. ...................................... 525/62; 526/319
[58] Field of Search ........................... 525/62; 526/319

[56] References Cited

U.S. PATENT DOCUMENTS

| | | | |
|---|---|---|---|
| 2,582,055 | 1/1952 | Minsk et al. | 526/319 |
| 2,860,124 | 11/1958 | Starck et al. | 526/319 |
| 3,099,645 | 7/1963 | Wexler | 526/319 |
| 3,105,065 | 9/1963 | Fujii | 526/319 |
| 3,109,837 | 11/1963 | Lockheed et al. | 526/319 |
| 3,121,705 | 2/1964 | Lowell et al. | 526/319 |
| 3,127,381 | 3/1964 | Ehmann et al. | 526/319 |
| 3,162,626 | 12/1964 | Smidt et al. | 526/319 |
| 3,211,711 | 10/1965 | Eguchi et al. | 526/319 |
| 3,222,328 | 12/1965 | La Combe et al. | 526/319 |
| 3,303,174 | 2/1967 | Lanthier | 526/319 |
| 3,551,396 | 12/1970 | Lanthier | 526/319 |
| 4,323,666 | 4/1982 | Shirinian et al. | 526/319 |
| 4,463,138 | 7/1981 | Wu et al. | 526/319 |
| 4,485,225 | 11/1984 | Satoh et al. | 526/319 |

FOREIGN PATENT DOCUMENTS

| | | | |
|---|---|---|---|
| 0138217 | 7/1947 | Australia | 525/62 |
| 663529 | 5/1963 | Canada . | |
| 0004503 | 1/1985 | Japan | 525/62 |
| 0745381 | 2/1956 | United Kingdom | 526/319 |

OTHER PUBLICATIONS

A. R. Shultz; J. Am. Chem. Soc. 76 3422 (1954); Polyvinylacetate, A Light Scattering and Viscosity Study.
G. M. Burnett et al; J. Polym. Sci. 16 31 (1955); Polymerization of Vinyl Acetate at Low Temperatures.
M. Matsumoto et al; J. Polym. Sci. 46 148 (1960); Linearity of Low Conversion Polyvinyl Acetate.

*Primary Examiner*—Joseph L. Schofer
*Assistant Examiner*—J. M. Reddick
*Attorney, Agent, or Firm*—Oblon, Fisher, Spivak, McClelland & Maier

[57] ABSTRACT

The present invention provides a process for producing easily on an industrial scale a polyvinyl ester having a high degree of polymerization and PVA having a high degree of polymerization derived by saponification form such a polyvinyl ester. The process of this invention makes it possible to produce the desired product especially even when the polymerization is carried out until a high conversion to polymer is attained, as well as even when the polymerization is suspended while the conversion to polymer is still low.

14 Claims, No Drawings

PROCESS FOR PRODUCING POLYVINYL ESTER HAVING A HIGH DEGREE OF POLYMERIZATION AND PROCESS FOR PRODUCING POLYVINYL ALCOHOL HAVING A HIGH DEGREE OF POLYMERIZATION

BACKGROUND OF THE INVENTION

1. Field of the Invention:

The present invention relates to a process for producing a polyvinyl ester having a high degree of polymerization and also to a process for producing polyvinyl alcohol having a high degree of polymerization.

More particularly, the present invention relates to a new process for producing a polyvinyl ester having a high degree of polymerization indicated by an intrinsic viscosity not less than 1.5 dl/g, said process comprising subjecting a vinyl ester monomer to suspension polymerization at a polymerization temperature not more than 20° C. and not less than −20° C. and at an initial rate of polymerization not more than 10%/HR and not less than 0.01%/HR. (The intrinsic viscosity of the polyvinyl ester is defined by the value measured on polyvinyl acetate in acetone solution at 30° C. This polyvinyl acetate is prepared prior to measurements by saponifying the polyvinyl ester and then acetylating the saponified product.)

The present invention also relates to a new process for producing polyvinyl alcohol (referred to as PVA) having a high degree of polymerization indicated by an intrinsic viscosity not less than 1.5 dl/g, said process comprising subjecting a vinyl ester monomer to suspension polymerization at a polymerization temperature not more than 20° C. and not less than −20° C. and at an initial rate of polymerization not more than 10%/HR and not less than 0.01%/HR, and then saponifying the resulting polyvinyl ester in the usual way. (The intrinsic viscosity of the PVA is defined by the value measured on polyvinyl acetate in acetone solution at 30° C. This polyvinyl acetate is prepared prior to measurements by acetylating the PVA.)

Polyvinyl ester, especially polyvinyl acetate, is an important polymer as a base of adhesives and paints and also as a starting material of PVA. As is generally known, PVA is one of a few crystalline water-soluble polymers. On account of its superior interfacial properties and strength characteristic of crystalline water-soluble polymer, PVA finds use as paper treatment agent, textile treatment agent, and emulsion stabilizer. PVA is also important as a raw material for vinylon film and vinylon fiber.

Conventional PVA, however, was limited in the degree of polymerization. The upper limit was usually 2000, and it was about 3000 only in the case of special grade. One reason for this is that it is difficult to produce polyvinyl acetate having a high degree of polymerization from which PVA is produced, and another reason is that PVA having a high degree of polymerization has poor processability and is difficult to handle.

The recent rapid advance in processing technology has made it possible to handle polymers having an extremely high degree of polymerization. As the result, it has been found that such polymers have the physical properties which had never been known. By the same token, PVA having a high degree of polymerization is expected to have improved physical properties useful for the betterment in conventional application areas and also to have new capacities which will open up new application areas such as high-tenacity fibers.

2. Description of the Prior Art:

There are some reports of a polyvinyl ester having a high degree of polymerization, as listed below.

(1) A. R. Shultz; J. Am. Chem. Soc. 76 3422 (1954)

(2) G. M. Burnett, M. H. George, and H. W. Melville; J. Polym. Sci. 16 31 (1955)

(3) M. Matsumoto and Y. Ohyanagi; J. Polym. Sci. 46 148 (1960)

(4) U.S. Pat. No. 4,463,138

(5) Canadian Pat. No. 663,529

According to the reported literature (1)–(4), the polymerization of vinyl ester is accomplished by bulk polymerization in which the conversion of monomer to polymer is lower than, say, 25%. Bulk polymerization is an advantageous means to produce a polymer containing a minimum of impurities, and is often used in the laboratory experiment, and it does not cause any problem so long as it is suspended while the conversion is still low.

But it has serious disadvantages when it is applied to industrial production, because the viscosity of polymer solution increases as the polymerization proceeds. Where polymerization is performed at a low temperature as in the case of this invention, the viscosity of polymer solution increases to such a great extent that it is almost impossible to continue stirring even when the conversion to polymer is still low. In such a situation, the reaction of polymerization may easily become out of control due to insufficient heat removal and local heat accumulation, giving rise to a polymer having a low degree of polymerization.

Moreover, the rate constant of chain transfer reaction of vinyl ester monomer is extremely high, and the rate constant is greatly temperature-dependent and the degree of polymerization is much more affected by the polymerization temperature than in the case of styrene and methyl methacrylate.

Therefore, bulk polymerization is not suitable for the production of a polyvinyl ester having a high degree of polymerization, and consequently it is not suitable for the production of a polyvinyl ester to be saponified into PVA having a high degree of polymerization.

The above-mentioned Canadian Patent (5) is concerned with the process of emulsion polymerization; but it is not suitable for the production of a polyvinyl ester having a high degree of polymerization because said process requires a large amount of emulsifier which adversely affects the physical properties, especially heat resistance, of the resulting polyvinyl ester and hence PVA derived from it.

SUMMARY OF THE INVENTION

It is an object of the present invention to provide a process for producing easily on an industrial scale a polyvinyl ester having a high degree of polymerization and PVA having a high degree of polymerization derived by saponification from such a polyvinyl ester. The process of this invention makes it possible to produce the desired product especially even when the polymerization is carried out until a high conversion to polymer is attained, as well as even when the polymerization is suspended while the conversion to polymer is still low.

DESCRIPTION OF THE PREFERRED EMBODIMENTS

The present inventors carried out a series of researches on the process for producing easily on an industrial scale a polyvinyl ester having a high degree of polymerization. As the result, it was found that it is possible to produce a polyvinyl ester having a high degree of polymerization indicated by an intrinsic viscosity not less than 1.5 dl/g, when a vinyl ester monomer is subjected to suspension polymerization at a polymerization temperature not more than 20° C. and not less than −20° C. and at an initial rate of polymerization not more than 10 %/HR and not less than 0.01 %/HR. (The intrinsic viscosity of the polyvinyl ester is defined by the value measured on polyvinyl acetate in acetone solution at 30° C. This polyvinyl acetate is prepared prior to measurements by saponifying the polyvinyl ester and then acetylating the saponified product.)

It was also found that it is possible to produce PVA having a high degree of polymerization indicated by an intrinsic viscosity not less than 1.5 dl/g, when a polyvinyl ester is saponified in the usual way, said polyvinyl ester being obtained by subjecting a vinyl ester monomer to suspension polymerization at a polymerization temperature not more than 20° C. and not less than −20° C. and at an initial rate of polymerization not more than 10 %/HR and not less than 0.01 %/HR. (The intrinsic viscosity of the PVA is defined by the value measured on polyvinyl acetate in acetone solution at 30° C. This polyvinyl acetate is prepared prior to measurements by acetylating the PVA.) The present invention was completed on the basis of these findings.

According to this invention, the suspension polymerization is performed at a polymerization temperature not more than 20° C. and not less than −20° C. and at an initial rate of polymerization not more than 10%/HR and not less than 0.01 %/HR. Therefore, the following should be taken into serious consideration which is not required in the case of ordinary suspension polymerization to be performed at a high temperature. That is the polymerization system is easily affected by oxygen and impurities in the system because the concentration of radical is low in the system. Oxygen is especially deleterious because it works as a violent inhibitor. It should be removed from the polymerization system before polymerization and kept away from the system during polymerization.

To avoid the entrance of oxygen into the polymerization system, it is necessary to completely remove oxygen from water and monomer prior to use. For the removal of oxygen, water should be boiled and bubbled with nitrogen or argon having a purity not less than 99.9%, preferably not less than 99.99%, so that the dissolved oxygen is kept not more than $10^{-3}$ wt %, preferably not more than $10^{-4}$ wt %.

The vinyl ester monomer should preferably be purified in the usual way prior to use.

The suspension polymerization in this invention is usually performed batchwise. The suspension polymerization may be suspended at any time regardless of the conversion to polymer. In consideration of the processing after polymerization, it is preferable to carry out the polymerization until the conversion has reached 25% or above, especially 60% or above.

The vinyl ester monomer which can be used in this invention includes, for example, vinyl formate, vinyl acetate, vinyl propionate, vinyl valerate, vinyl caprate, vinyl laurate, and vinyl stearate. Vinyl acetate among them is preferable for the production of PVA.

The above-mentioned vinyl ester monomer may be copolymerized with a copolymerizable monomer such as (meth)acrylic acid, (meth)acrylic acid ester, itaconic acid, and ester thereof, maleic acid ester, maleic anhydride, (meth)acrylamide and derivatives thereof, vinyl chloride, vinyl fluoride, vinylidene chloride, vinylidene fluoride, acrylonitrile, and vinylalkoxysilane.

The stabilizer that can be used in polymerization includes, for example, PVA derivatives, cellulose derivatives, and surface active agents. The selection of a proper stabilizer should be carefully made in consideration of the interfacial properties at the low polymerization temperature.

The suspension polymerization in this invention may be initiated by (1) the thermal decomposition of a peroxide or azo compound or (2) the irradiation of light, radiation, or plasma.

In the first case (1), it is impossible to use benzoyl peroxide and 2,2′-azobisisobutylonitrile because their decomposition temperature is enough higher than the temperature employed in this invention. The preferred peroxide and azo compound are diisopropyl peroxydicarbonate, isobutylyl peroxide, and 2,2′-azobis(4-methoxy-2,4-dimethylvaleronitrile) which decompose even at a low temperature. In the second case (2), ultraviolet light, gamma-rays, and plasma can be used. The irradiation of ultraviolet light may be performed in combination with 2,2′-azobisisobutylonitrile as a sensitizer.

In the suspension polymerization in this invention, the proper rate of stirring is 15 to 1500 m/min expressed by maximum peripheral speed. Stirring slower than the lower limit 15 m/min does not provide completely dispersed particles, and stirring faster than the upper limit 1500 m/min causes coalescence during polymerization.

As mentioned above, the present invention provides a process for producing polyvinyl ester having a high degree of polymerization which is indicated by an intrinsic viscosity not less than 1.5 dl/g, (The intrinsic viscosity of the polyvinyl ester is defined by the value measured on polyvinyl acetate in acetone solution at 30° C. This polyvinyl acetate is prepared prior to measurements by saponifying the polyvinyl ester and then acetylating the saponified product.) It is important that the intrinsic viscosity should be not less than 1.5 dl/g, preferably not less than 2.0 dl/g, and more preferably not less than 2.5 dl/g.

As mentioned above, the present invention also provides a process for producing PVA having a high degree of polymerization indicated by an intrinsic viscosity not less than 1.5 dl/g. (The intrinsic viscosity of the PVA is defined by the value measured on polyvinyl acetate in acetone solution at 30° C. This polyvinyl acetate is prepared prior to measurements by acetylating the PVA.) It is important that the intrinsic viscosity should be not less than 1.5 dl/g, preferably not less than 2.0 dl/g, and more preferably not less than 2.5 dl/g.

The object is achieved by performing suspension polymerization at a polymerization temperature not more than 20° C. and not less than −20° C., preferably not more than 15° C. and not less than −20° C., and more preferably not more than 10° C. and not less than −20° C., and at an initial rate of polymerization not more than 10 %/HR and not less than 0.01 %/HR, preferably not more than 7.5%/HR and not less than 0.01 %/HR, and more preferably not more than 1 %/HR and not less than 0.01 %/HR. Polymerization at a polymerization temperature not more than 0° C. is made possible by adding a water-soluble substance which lowers the freezing point. Examples of the water-soluble substance include alcohols, glycols, glycerin, and inorganic salts (e.g., NaCl and KCl). Methyl alcohol, NaCl, and KCl are preferable because they affect the polymerization only a little.

The polyvinyl ester obtained by the suspension polymerization is saponified into PVA. The saponification reaction can be performed in the usual way. Preferably, it should be performed by an alcoholysis employing a catalyst such as NaOH, NaOCH$_3$, and NaOC$_2$H$_5$.

The most important feature of this invention is to perform suspension polymerization at a low polymerization temperature not more than 20° C. and not less than −20° C. and at a low initial rate of polymerization not more than 10 %/HR and not less than 0.01 %/HR. The suspension polymerization under such conditions provides a polyvinyl ester having a high degree of polymerization, and it can be performed without engineering difficulties concerning stirring and heat removal at the time of polymerization. In addition, the suspension polymerization under such conditions can be performed until a high conversion to polymer is attained, and consequently the resulting polyvinyl ester is easily separated and purified and the unreacted monomer is easily removed. This is favorable to the subsequent saponification reaction. The thus obtained polyvinyl ester having a high degree of polymerization has a high strength and can be made into sheet and film having a high strength.

The above-mentioned polyvinyl ester having a high degree of polymerization is saponified in the usual way into PVA having a high degree of polymerization. The thus obtained PVA will find use as high-strength PVA sheet and film and high-tenacity PVA fiber. It will also find use as textile size and paper finishing agent in the conventional applicant areas of PVA.

The invention is now described in more detail with reference to the following examples, which are not intended to limit the scope of this invention. In the examples, "%" and "parts" mean "wt %" and "parts by weight", respectively.

EXAMPLE 1

In a reactor equipped with a thermometer, nitrogen inlet tube, and condenser were placed 3000 parts of distilled water and 0.3 parts of PVA-217 (degree of polymerization: 1700, degree of saponification: 88 mol %, a product of Kuraray Co., Ltd.). The reactor was heated to dissolve PVA-217 at 90° C. With continuous introduction of nitrogen (purity: 99.99%), the reactor was cooled in a constant temperature bath until the internal temperature went down to 15° C. 1500 parts of vinyl acetate monomer which had been purified in the usual way was subjected to nitrogen replacement at 60° C. and then cooled to 15° C. with continuous bubbling of nitrogen. In the cooled vinyl acetate monomer was rapidly dissolved 5.4 parts of 2,2′-azobis (4-methoxy-2,4-dimethylvaleronitrile). The vinyl acetate monomer thus prepared was added with stirring to the reactor containing the aqueous solution of PVA-217, and polymerization was started. During polymerization, the reactor was sealed with nitrogen gas to prevent the entrance of oxygen. The polymerization proceeded at 15° C. and at an initial rate of polymerization of 7.5 %/HR.

48 hours later, the unreacted monomer was removed at 15° C. under reduced pressure for 5 hours. The resulting pearl-like polymer was filtered out and washed with water repeatedly. The washed polymer was dried at 30° C. under reduced pressure. Thus there was obtained 1210 parts of polymer. (Conversion to polymer: 80.7%)

A portion of the thus obtained polyvinyl acetate was dissolved in methanol to give a 6% solution. Saponification was performed at 40° C., with the mol ratio of NaOH to VAc being 0.05. The resulting PVA (0.1 parts) was acetylated again at 105° C. for 20 hours with intermittent stirring in a mixture composed of 8 parts of acetic anhydride and 2 parts of pyridine. The resulting polyvinyl acetate was purified by repeated reprecipitation with ether from an acetone solution and with water from an acetone solution. The intrinsic viscosity $[\eta]$ of the purified polyvinyl acetate was measured on acetone solutions at 30° C. (by dilution method using an Ubbellohde viscometer). The measured value $[\eta]$ was 2.52 dl/g.

The polyvinyl acetate obtained as mentioned above was dissolved in methanol and saponified under the same condition as mentioned above. Thus there was obtained PVA having a degree of saponification of 98.9 mol %. The PVA was acetylated and the resulting polyvinyl acetate was purified by reprecipitation under the same condition as mentioned above. The intrinsic viscosity $[\eta]$ of the purified polyvinyl acetate was measured on acetone solutions at 30° C. The measured value $[\eta]$ was 2.52 dl/g.

COMPARATIVE EXAMPLE 1

In a reactor equipped with a thermometer, nitrogen inlet tube, and condenser were placed 1.08 parts of 2,2′-azobis(4-methoxy-2,4-dimethylvaleronitrile). With the atmosphere replaced with nitrogen, the reactor was cooled in a constant temperature bath at 15° C. 300 parts of vinyl acetate monomer which had been purified in the usual way was subjected to nitrogen replacement at 60° C. and then cooled to 15° C. with continuous bubbling of nitrogen. The vinyl acetate monomer thus prepared was added with stirring to the reactor, and polymerization was started. During polymerization, the reactor was sealed with nitrogen gas to prevent the entrance of oxygen. The polymerization proceeded at 15° C. and at an initial rate of polymerization of 7.5 %/HR. About two hours later, the viscosity of the reaction mixture increased to such an extent that stirring was difficult to perform, and 4 hours later, it was almost impossible to continue stirring and to keep the internal temperature at 15° C.

24 hours after the start of polymerization, the resulting polymer was discharged and the conversion to polymer was measured. The measured value was 79%. The vinyl acetate monomer was removed under the presence of thiourea. Thus there was obtained polyvinyl acetate. A portion of it was saponified in the same way as in Example 1 to give PVA. The intrinsic viscosity $[\eta]$ of polyvinyl acetate obtained by acetylation was 1.42 dl/g.

In this Comparative Example, bulk polymerization was performed, with the amount of vinyl acetate monomer reduced to one-fifth that in Example 1. Nevertheless, the viscosity of the reaction mixture increased to such an extent that it was impossible to continue stirring and keep the internal temperature at 15° C. As the result, the conversion to polymer was almost equal to that in Example 1, whereas the intrinsic viscosity $[\eta]$ of acetylated product was much smaller than that in Example 1. The above-mentioned results indicate that suspension polymerization is suitable for producing at a low temperature a polymer having a high degree of polymerization.

EXAMPLES 2 to 6

The same procedure as in Example 1 was repeated to give polyvinyl acetate, except that changes were made in the amount of 2,2'-azobis-(4-methoxy-2,4-dimethylvaleronitrile), the polymerization time, the initial rate of polymerization, and the polymerization temperature. A portion of the resulting polyvinyl acetate was saponified to give PVA in the same way as in Example 1. Table 1 shows the conditions and results of polymerization and the intrinsic viscosity $[\eta]$ of polyvinyl acetate obtained by acetylation of PVA.

was dried at 30° C. under reduced pressure. Thus there was obtained 720 parts of polymer. (Conversion to polymer: 48%)

A portion of the thus obtained polyvinyl acetate was dissolved in methanol to give a 6% solution. Saponification was performed at 40° C., with the mol ratio of NaOH to VAc being 0.05. The resulting PVA was acetylated in the same manner as in Example 1. The intrinsic viscosity $[\eta]$ of the purified polyvinyl acetate was measured on acetone solutions at 30° C. The measured value was 2.95 dl/g.

The polyvinyl acetate obtained as mentioned above was dissolved in methanol and saponified under the same condition as mentioned above. The resulting PVA was acetylated and the intrinsic viscosity $[\eta]$ of the resulting polyvinyl acetate was measured on acetone solutions at 30° C. The measured value was 2.95 dl/g.

TABLE 1

| | Conditions of polymerization | | | | Results of polymerization | | |
|---|---|---|---|---|---|---|---|
| Example | Initiator* (parts) | Polymerization temperature (°C.) | Polymerization time (HR) | Initial rate of polymerization (%/HR) | Amount of PVAc obtained (parts) | Conversion to polymer (%) | $[\eta]$ of acetylated PVA (dl/g) |
| 2 | 5.0 | 10 | 65 | 3.6 | 1188 | 79.2 | 2.70 |
| 3 | 1.25 | 10 | 70 | 1.80 | 1236 | 82.4 | 3.02 |
| 4 | 0.078 | 10 | 120 | 0.9 | 915 | 61.0 | 3.22 |
| 5 | 0.125 | 5 | 95 | 1.0 | 1226 | 81.7 | 3.15 |
| 6 | 0.125 | 0 | 146 | 0.56 | 1061 | 70.7 | 3.35 |

*2,2'-azobis(4-methoxy-2,4-dimethylvaleronitrile)

COMPARATIVE EXAMPLE 2

The same procedure as in Example 1 was repeated to give 1360 parts of polyvinyl acetate, except that 0.3 parts of 2,2'-azobisisobutylonitrile was used as an initiator and the polymerization was performed at a polymerization temperature of 60° C. and at a initial rate of polymerization of 12.5 %/HR. A portion of the resulting polyvinyl acetate was saponified to give PVA in the same way as in Example 1. The intrinsic viscosity $[\eta]$ of polyvinyl acetate measured immediately after polymerization was 2.25 dl/g, and that of polyvinyl acetate obtained by acetylation of PVA was 1.14dl/g.

EXAMPLE 7

In a reactor equipped with a thermometer, nitrogen inlet tube, and condenser were placed 3000 parts of distilled water, 23 parts of sodium chloride, and 0.3 parts of PVA-217 (degree of polymerization: 1700, degree of saponification: 88 mol %, a product of Kuraray Co., Ltd.). The reactor was heated to dissolve PVA-217 at 90° C. With continuous bubbling of nitrogen, the reactor was cooled in a constant temperature bath until the internal temperature went down to −5° C. 1500 parts of vinyl acetate monomer which had been purified in the usual way was subjected to nitrogen replacement at 60° C. and then cooled to −5° C. with continuous bubbling of nitrogen. In the cooled vinyl acetate monomer was rapidly dissolved 12.5 parts of 2,2'-azobis(4-methoxy-2,4-dimethylvaleronitrile). The vinyl acetate monomer was added with stirring to the reactor containing the aqueous solution of PVA-217, and polymerization was started. During polymerization, the reactor was sealed with nitrogen gas to prevent the entrance of oxygen. The polymerization proceeded at −5° C. and at an initial rate of polymerization of 1%/HR.

120 hours later, the unreacted monomer was removed at −5° C. under reduced pressure for 24 hours. The resulting pearl-like polymer was filtered out and washed with water repeatedly. The washed polymer

What is claimed is:

1. A process for producing a polyvinyl ester having a high degree of polymerization indicated by an intrinsic viscosity not less than 1.5 dl/g, said process comprising subjecting a vinyl ester monomer to suspension polymerization at a polymerization temperature not more than 20° C. and not less than −20° C. and at an initial rate of polymerization not more than 10 %/HR and not less than 0.01 %/HR, (the intrinsic viscosity of the polyvinyl ester being defined by the value measured on polyvinyl acetate in acetone solution at 30° C., said polyvinyl acetate being prepared prior to measurements by saponifying the polyvinyl ester and then acetylating the saponified product).

2. A process for producing a polyvinyl ester having a high degree of polymerization as set forth in claim 1, wherein the polymerization temperature is not more than 15° C. and not less than −20° C.

3. A process for producing a polyvinyl ester having a high degree of polymerization as set forth in claim 2, wherein the polymerization temperature is not more than 10° C. and not less than −20° C.

4. A process for producing a polyvinyl ester having a high degree of polymerization as set forth in claim 1, wherein the conversion to polymer is not less than 25%.

5. A process for producing a polyvinyl ester having a high degree of polymerization as set forth in claim 4, wherein the conversion to polymer is not less than 60%.

6. A process for producing a polyvinyl ester having a high degree of polymerization as set forth in claim 1, wherein the suspension polymerization is performed using water containing not more than $10^{-3}$ wt % of dissolved oxygen.

7. A process for producing a polyvinyl ester having a high degree of polymerization as set forth in claim 1, wherein the vinyl ester monomer is vinyl acetate.

8. A process for producing a polyvinyl alcohol having a high degree of polymerization indicated by an intrinsic viscosity not less than 1.5 dl/g, said process comprising subjecting a vinyl ester monomer to suspension polymerization at a polymerization temperature not more than 20° C. and not less than −20° C. and at an initial rate of polymerization not more than 10 %/HR and not less than 0.01 %/HR, and then saponifying the resulting polyvinyl ester (the intrinsic viscosity of the polyvinyl alcohol being defined by the value measured on polyvinyl acetate in acetone solution at 30° C., said polyvinyl acetate being prepared prior to measurements by acetylating the polyvinyl alcohol).

9. A process for producing a polyvinyl alcohol having a high degree of polymerization as set forth in claim 8, wherein the polymerization temperature is not more than 15° C. and not less than −20° C.

10. A process for producing a polyvinyl alcohol having a high degree of polymerization as set forth in claim 9, wherein the polymerization temperature is not more than 10° C. and not less than −20° C.

11. A process for producing a polyvinyl alcohol having a high degree of polymerization as set forth in claim 8, wherein the conversion to polymer is not less than 25%.

12. A process for producing a polyvinyl alcohol having a high degree of polymerization as set forth in claim 11, wherein the conversion to polymer is not less than 60%.

13. A process for producing a polyvinyl alcohol having a high degree of polymerization as set forth in claim 8, wherein the suspension polymerization is performed using water containing not more than $10^{-3}$ wt % of dissolved oxygen.

14. A process for producing a polyvinyl alcohol having a high degree of polymerization as set forth in claim 8, wherein the vinyl ester monomer is vinyl acetate.

* * * * *